June 30, 1925.

C. E. MAYNARD 1,544,255

ART OF MAKING NONPOROUS TUBES AND OTHER ARTICLES

Filed Oct. 1, 1924

INVENTOR.
Charles Edgar Maynard
BY
Edward A Taylor
ATTORNEY.

Patented June 30, 1925.

1,544,255

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

ART OF MAKING NONPOROUS TUBES AND OTHER ARTICLES.

Application filed October 1, 1924. Serial No. 741,065.

*To all whom it may concern:*

Be it known that I, CHARLES EDGAR MAYNARD, a citizen of the United States of America, residing at Northampton, in the county of Hampshire and State of Massachusetts, have invented certain new and useful Improvements in the Art of Making Nonporous Tubes and Other Articles, of which the following is a specification.

In the manufacture of inflatable rubber goods such, for example, as inner tubes for automobile tires there have been employed two main methods of fabricating the rubber into tubular form: by the rolling of a sheet around a mandrel, and by the formation of the tube directly from the rubber mass by the well-known tubing or extrusion machine. In making tubes by the former method the total wall thickness is generally built up out of several convolutions of the relatively thin sheet, but in the extrusion method the entire thickness must be formed at one operation.

I have found that heavy tubes made in the usual way by tubing give great trouble due to porosity. It is of course possible to make heavy tubes non-porous by laminating them of a plurality of thicknesses of thin sheet stock, but this method is costly as compared to tubing and my researches have therefore been directed to making the tubing method comparable as to freedom from porosity with the laminating method. In the course of numerous experiments I have found that if the tube is quickly cooled upon its formation no porosity will result in the vulcanized tube. Actual tests have shown that the addition of quick cooling decreased the number of porous tubes from over 50% in the case of otherwise identical tubes made without cooling, to zero in the case of the cooled tubes. In the desire to understand the reason for this surprising and complete elimination of porosity I have studied tubes made with and without quick cooling, both microscopically and otherwise; and am satisfied that the phenomenon depends upon the inhibition of the formation of large sulfur crystals which otherwise melt out, causing porosity, during subsequent vulcanization. According to my invention I prevent the formation of large crystals by cooling the extruded mass before the sulfur has a chance to migrate. Any crystallization which takes place under these circumstances will be restricted to the usual "bloom," in which the sulfur concretions are of a dustlike fineness insufficient to cause porosity; instead of developing to the extent which the retained heat of the heavy rubber mass would otherwise permit.

The invention is of particular utility in cases where the tubes are to be vulcanized in open steam without external confining means, for the steam will fuse out the sulfur and penetrate the voids thus formed without exerting any tendency as a confining wrapping or mold would to close up the holes. It is not, however, restricted to that use.

One way of carrying out the invention on a commercial scale is illustrated in the accompanying drawings, in which Fig. 1 is a side elevation of an apparatus which may be used in carrying out the method;

Figure 3:
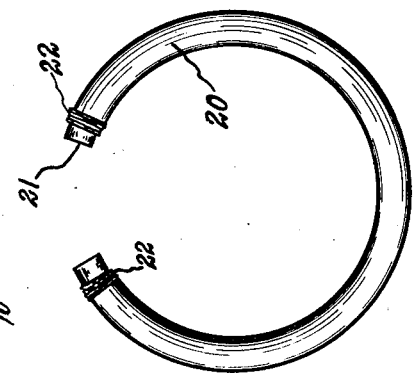
Fig. 3 is a view of a tube mounted on a mandrel for vulcanization.
Figure 2:
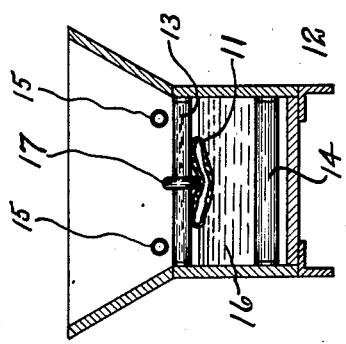
Fig. 2 is a section on line 2—2 of Fig. 1.
Figure 1:
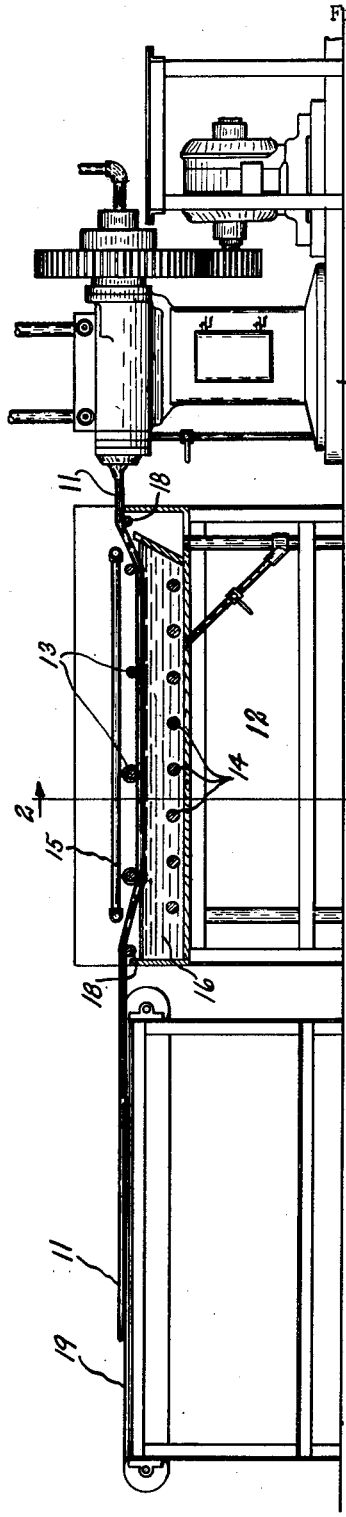

I have illustrated conventionally at 10 a tubing machine adapted to extrude a tube 11 of rubber continuously as long as the machine is kept supplied with rubber. As is customary in machines of this character it is fitted with suitable heating and cooling means for preserving the rubber in the proper consistency for smooth extrusion, and with means for introducing a lubricant such as soapstone into the formed tube to prevent adherence of its walls. The details of this machine form no part of the invention and need not be described. Positioned so that the tube reaches it as soon as convenient after its formation is a cooling device indicated generically by 12. This also may be of any desired construction, the only requirement being that it shall chill the rubber quickly to a temperature preventing large concretions of sulfur. Ordinary room temperature is sufficiently low if it is reached in a short enough time. In the embodiment shown this device has top and bottom rollers 13 and 14 which support the tube loosely during its passage, and spray pipes 15 through which cold water is forced to strike against the top of the flattened tube, the bottom of which rests upon a body of water 16. Certain of the rollers 13 may be provided with enlarged portions 17 to aid in centralizing the tube. Guide rolls 18 direct the tube to the apparatus and from it to a receiving conveyor 19 upon which the tube may be cut to the desired length.

The cooled material may now be stored in piles without danger of the retained heat causing large crystals, and may be formed as desired into the articles to be made. Since the main purpose of the invention is in the production of inner tubes, I have shown in Fig. 3 a tube 20 made of the material prepared as above, cut to length, and mounted on a curved mandrel 21. By taping the ends of this tube to the mandrel as at 22 it can be vulcanized in a heater in open steam without danger of porosity, there being no cavities left by sulfur crystals for the steam to enter.

Having thus described my invention, I claim:

The process of making non-porous rubber tubes which consists in extruding the rubber stock in hot condition in tubular form, cooling the tube so formed promptly after its formation to prevent the formation of sulfur crystals of appreciable size, mounting the tube on a mandrel, and vulcanizing the tube with its surface in direct contact with a vulcanizing fluid.

CHARLES EDGAR MAYNARD.